(12) United States Patent
Iino et al.

(10) Patent No.: US 7,971,875 B2
(45) Date of Patent: Jul. 5, 2011

(54) SHEET ACCUMULATION APPARATUS AND IMAGE FORMATION APPARATUS INCLUDING THE APPARATUS

(75) Inventors: Makoto Iino, Kofu (JP); Hiroto Akiyama, Chuo (JP); Tomohisa Shimizu, Minami-Alps (JP); Masato Hosaka, Minami-Alps (JP); Masaki Higuchi, Yamanashi-ken (JP)

(73) Assignee: Nisca Corporation, Minamikoma-Gun, Yamanashi (JP)

( * ) Notice: Subject to any disclaimer, the term of this patent is extended or adjusted under 35 U.S.C. 154(b) by 890 days.

(21) Appl. No.: 11/907,317

(22) Filed: Oct. 11, 2007

(65) Prior Publication Data

US 2008/0088082 A1 Apr. 17, 2008

(30) Foreign Application Priority Data

Oct. 13, 2006 (JP) .................................. 2006-279890

(51) Int. Cl.
*B65H 31/04* (2006.01)
(52) U.S. Cl. ........................ 271/213; 414/343; 414/396
(58) Field of Classification Search .................. 271/207, 271/213; 414/340, 343, 391, 396, 401, 788, 414/789.9
See application file for complete search history.

(56) References Cited

U.S. PATENT DOCUMENTS

| 6,099,452 A | * | 8/2000 | Hoza et al. | .................... | 493/416 |
| 6,736,584 B2 | * | 5/2004 | Dehn et al. | .................... | 414/396 |
| 6,991,229 B2 | * | 1/2006 | Yamakawa et al. | ........... | 271/223 |

FOREIGN PATENT DOCUMENTS

| DE | 3136950 A1 | * | 10/1982 |
| JP | S63-139872 | | 6/1988 |
| JP | 2000-143070 | | 5/2000 |
| JP | 2003-341908 | | 12/2003 |

* cited by examiner

*Primary Examiner* — Michael C McCullough
(74) *Attorney, Agent, or Firm* — Manabu Kanesaka

(57) ABSTRACT

A sheet accumulation apparatus includes a tray moving device elevatably provided at an apparatus frame and having a fork member; a tray device detachably attached to the fork member; a driving device for elevating the tray moving device; and a carrier device having a hand truck frame with a fork member. An operation handle is connected to the hand truck frame for accommodating the tray device separated from the tray moving device to transport the tray device from the tray moving device. The tray moving device and the carrier device are structured so that the tray device is transferred between the tray moving device and the carrier device at an attachment/detachment position at which the tray moving device is lowered.

11 Claims, 10 Drawing Sheets

Blocking position

Withdrawal position

SHEET ACCUMULATION APPARATUS AND IMAGE FORMATION APPARATUS INCLUDING THE APPARATUS

BACKGROUND OF THE INVENTION AND RELATED ART STATEMENT

The present invention relates to a sheet accumulation apparatus by which sheets are sequentially discharged from an image formation apparatus for example through a paper ejection opening into a tray means. The present invention relates to an improved tray elevating mechanism by which a tray means on which a large amount of sheets is loaded can be easily transported out of the apparatus.

Generally, this type of sheet accumulation apparatus is widely known as an apparatus by which sheets discharged from an image formation apparatus (e.g., printing machine, copier) are loaded and stored in a tray means provided at the lower side of a paper ejection opening. Then, the apparatus for accumulating therein a large amount of continuously discharged sheets elevates this tray means in accordance with the load amount. When this tray is full or when a job is completed, a user takes the sheets out of the tray.

When a large amount of sheets are taken out of the tray as described above, the sheets are transshipped to a hand truck for example. A technique for simplifying this transshipment is disclosed, for example, in Japanese Patent Laid-Open No. 2000-143070 (Patent Publication 1). This publication discloses an apparatus by which a tray is separated from a lift mechanism for elevating the tray to load sheets in a pallet-like manner and, when the sheets are taken out, a hand truck for transportation is positioned and set below the lift mechanism and the tray descended by the lift mechanism is moved on the hand truck and is moved out of the apparatus.

Thus, according to the apparatus of this publication, a tray and an elevating mechanism (elevator mechanism) are provided at a position protruding from an apparatus housing to outside, a hand truck is positioned and set below a tray in which sheets are loaded, and the tray is descended onto the hand truck to automatically transship the tray into the hand truck. In this manner, sheets in the tray can be transported to outside without being transshipped to a transport apparatus such as a hand truck. In order to secure the transshipment of this tray, the accumulation apparatus includes a positioning mechanism for positioning and setting a truck at a predetermined transship position and a sensor for detecting a hand truck set at this position.

As described above, Patent Publication 1 as described above, for example, suggests a technique for separating a tray in which sheets are loaded from an elevating arm for supporting and elevating this tray to accumulate sheets in the tray to transship the tray in which the sheets are loaded into a transportation hand truck in a pallet-like manner to discharge the tray out of the apparatus. In this case, a transportation hand truck 90 has been conventionally structured, as shown in FIG. 9(a), so that a back face of a flat plate-like bottom plate 91 includes a plurality of wheels 92 and an upper face 91a of this bottom plate has thereon a tray member 93 and the bottom plate 91 is integrated with a handle 93 pushed by hands. An elevating arm 94 includes two fork members 94a and 94b connected to an elevating mechanism and the fork members 94a and 94b enter a stepped space 95 formed between the bottom plate 91 and the tray 93 of the hand truck.

Thus, a distance H between the sheet storage position of the tray 93 and a contact face can be calculated by: H=H1 (tray elevating height)+H2 (tray attachment/detachment height). This tray attachment/detachment height can be calculated by H2=h1 (wheel height)+h2 (bottom plate height)+h3 (fork insertion height). The hand truck structure as described above is disadvantageous in that a high tray attachment height causes a dead space, causing a larger size of the apparatus. For example, when heights of a paper ejection opening and an installation surface (which are equal to the above distance L, respectively) are set to be a predetermined value, a tray elevating height (H1) to which the tray is elevated in order to load sheets can be calculated by H1=(H−H2). Thus, a disadvantage is caused where a high tray attachment/detachment height (H2) reduces the maximum amount of a load that can be stored in the tray.

This invention has been made in view of the above problem. It is the first object to provide a sheet accumulation apparatus having a structure by which a tray in which sheets are loaded is discharged by a transportation carrier out of the apparatus. This sheet accumulation apparatus can secure, without having to increase the size thereof, the maximum load amount of sheets that can be loaded in the tray. Thus, this sheet accumulation apparatus can have a compact size and a large amount of sheets can be loaded therein.

It is the second object to provide a sheet accumulation apparatus by which a pile of sheets can be prevented from being collapsed when a tray in which sheets are loaded is moved from elevating arms of the apparatus to a transport carrier, and an image formation apparatus including this sheet accumulation apparatus.

Other objects and features of this invention will be clear from the following description of illustrative embodiments with reference to the attached drawings.

SUMMARY OF THE INVENTION

In order to achieve the objects, this invention uses the following structures.

A sheet accumulation apparatus comprises: a paper ejection opening for sequentially discharging sheets; a tray elevating means provided at the lower side of the paper ejection opening in an elevating manner; a tray means that is detachably attached to the tray elevating means and in which sheets from the paper ejection opening are loaded; a driving means for elevating the tray elevating means under the paper ejection opening; and a carrier means for accommodating the tray means separated from the tray elevating means to transport the tray means out of the apparatus. The tray elevating means and the carrier means are structured so that the tray means is mounted from the former to the latter or from the latter to the former at an attachment/detachment position at which the tray elevating means is lowered. The carrier means is composed of a hand truck frame and an operation handle connected to this hand truck frame. The hand truck frame is attached with a transport wheel and has a fork member on which the tray means is placed. The tray elevating means has a fork member on which the tray means is placed. A fork member of the carrier means side and a fork member of the tray elevating means side are engaged on a substantially the same plane at the attachment/detachment position.

An apparatus frame attached with the tray elevating means includes a guide member for guiding the carrier means to the attachment/detachment position and a positioning member for abutting this carrier means to the attachment/detachment position to position the carrier means. Each of a fork member of the tray elevating means and a fork member of the carrier means are composed of a pair of left and right arms having a predetermined interval therebetween so that the tray means can be placed on the fork member. The left and right arms of the tray elevating means side are structured to be engaged with the center of the left and right arms of the carrier means side.

The hand truck frame has a substantially angular U-like shape by the pair of left and right arms and a connecting arm for connecting the arms. The operation handle is fixed to the connecting arm. The pair of left and right arms is attached with wheels. A fork member of the tray elevating means is elevated by the driving means between an upper limit position for positioning the tray means at the paper ejection opening and a lower limit position under the tray means placed on a fork member of a carrier means positioned and set at the attachment/detachment position.

The sheet accumulation apparatus comprises: a paper ejection opening for sequentially discharging sheets: a tray elevating means elevatably provided at the lower side of the paper ejection opening; a tray means that is detachably attached to the tray elevating means and in which sheets from the paper ejection opening are loaded; a sheet conveyance means for conveying a sheet from the paper ejection opening to the downstream of a paper ejection opening at the upper side of the tray means; a sheet tip regulating means abutted with the tip ends of sheets sent from the sheet conveyance means to regulate the sheets to store the sheets on the tray means; a driving means for elevating the tray elevating means under the paper ejection opening; and a carrier means for accommodating the tray means separated from the tray elevating means to transport the tray means out of the apparatus. The tray elevating means and the carrier means are structured so that the tray means is mounted from the former to the latter or from the latter to the former at an attachment/detachment position at which a tray elevating means is lowered. In the sheet accumulation apparatus, the carrier means is composed of a hand truck frame and an operation handle connected to this hand truck frame. The hand truck frame is attached with a transport wheel and has a fork member on which the tray means is placed. The tray elevating means has a fork member on which the tray means is placed. A fork member of the carrier means side and a fork member of the tray elevating means side are structured to be engaged to each other on a substantially the same plane at the attachment/detachment position.

The sheet accumulation apparatus has: an image formation apparatus having an image formation means for forming an image on a sheet; a paper ejection opening through which sheets from the image formation apparatus are sequentially discharged; and a tray means in which the sheets from the paper ejection opening are loaded.

According to the invention as described above, the tray elevating means provided at the apparatus and a transportation carrier means are detachably attached with the tray means so that the tray can be attached from the former and the latter or from the latter to the latter. In this structure, the tray elevating means and the carrier means are respectively structured so that a tray is placed on a fork member. Both of the fork members are structured so as to be engaged to each other on a substantially the same plane. Thus, the apparatus can have a smaller size (in particular, the apparatus can have a smaller height), thus providing the apparatus with a compact size. Specifically, a tray attachment height of a conventional carrier means requires a wheel and a bottom plate height (thickness) and an insertion height of an elevating arm. While the entirety of the conventional apparatus requires a space in the height direction determined based on this tray attachment height and the elevating height of the elevating arm, the tray attachment height of the present invention is determined based on a wheel and a fork member height (thickness). Thus, the apparatus can have a compact size.

The carrier means can be attached with a tray at a low posture. At the same time, a fork member of the hand truck has a wide width and a fork member of an elevating arm has a narrow width. As a result, a pile of sheets can be prevented from being collapsed when being transported by a hand truck constituting the carrier means to outside of the apparatus.

DETAILED DESCRIPTION OF PREFERRED EMBODIMENTS

Hereinafter, the present invention will be described based on preferred embodiments.

Figure 1:
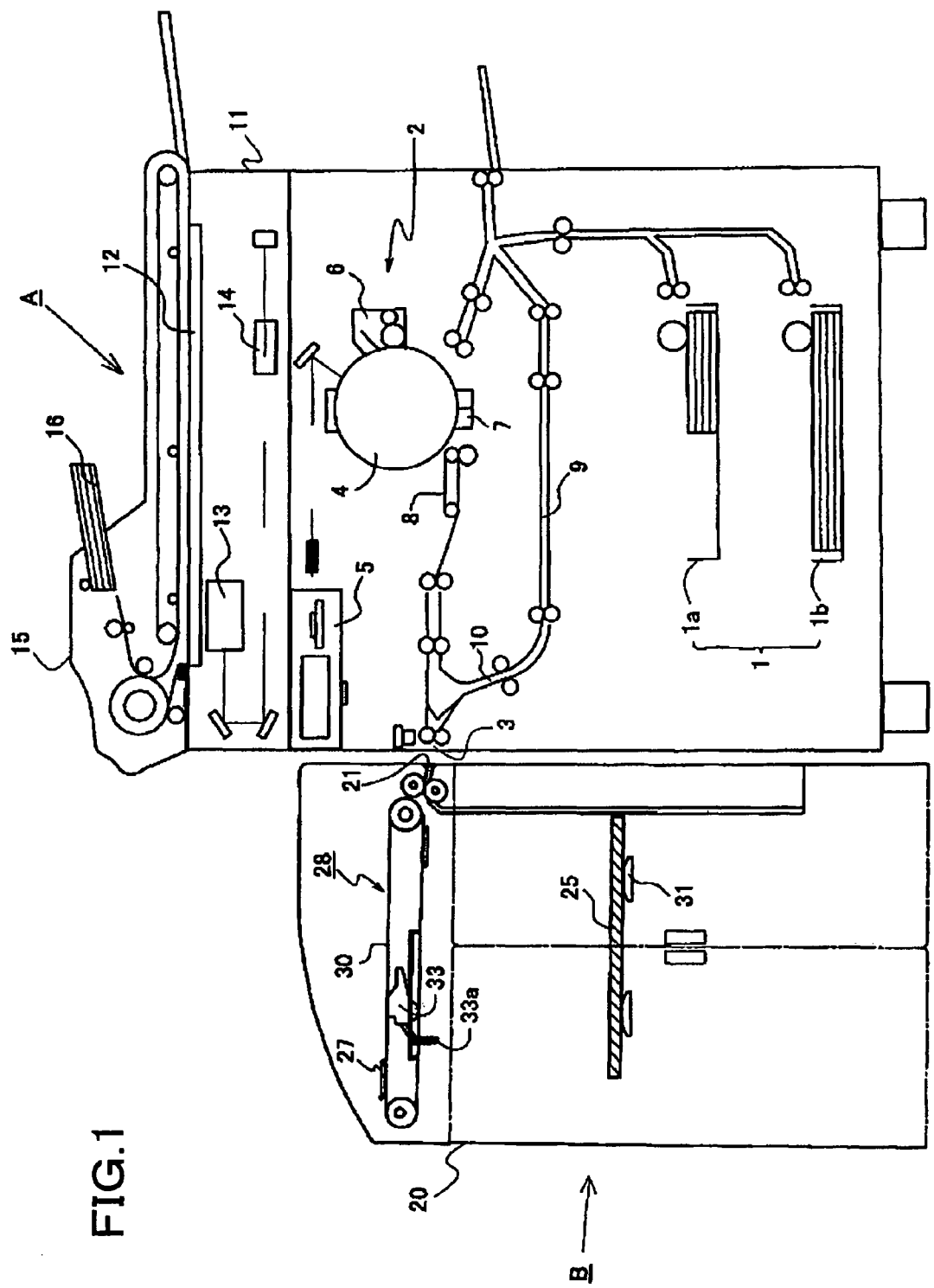
FIG. 1 illustrates the entirety of an image formation system including a sheet accumulation apparatus according to the present invention.
Figure 2:
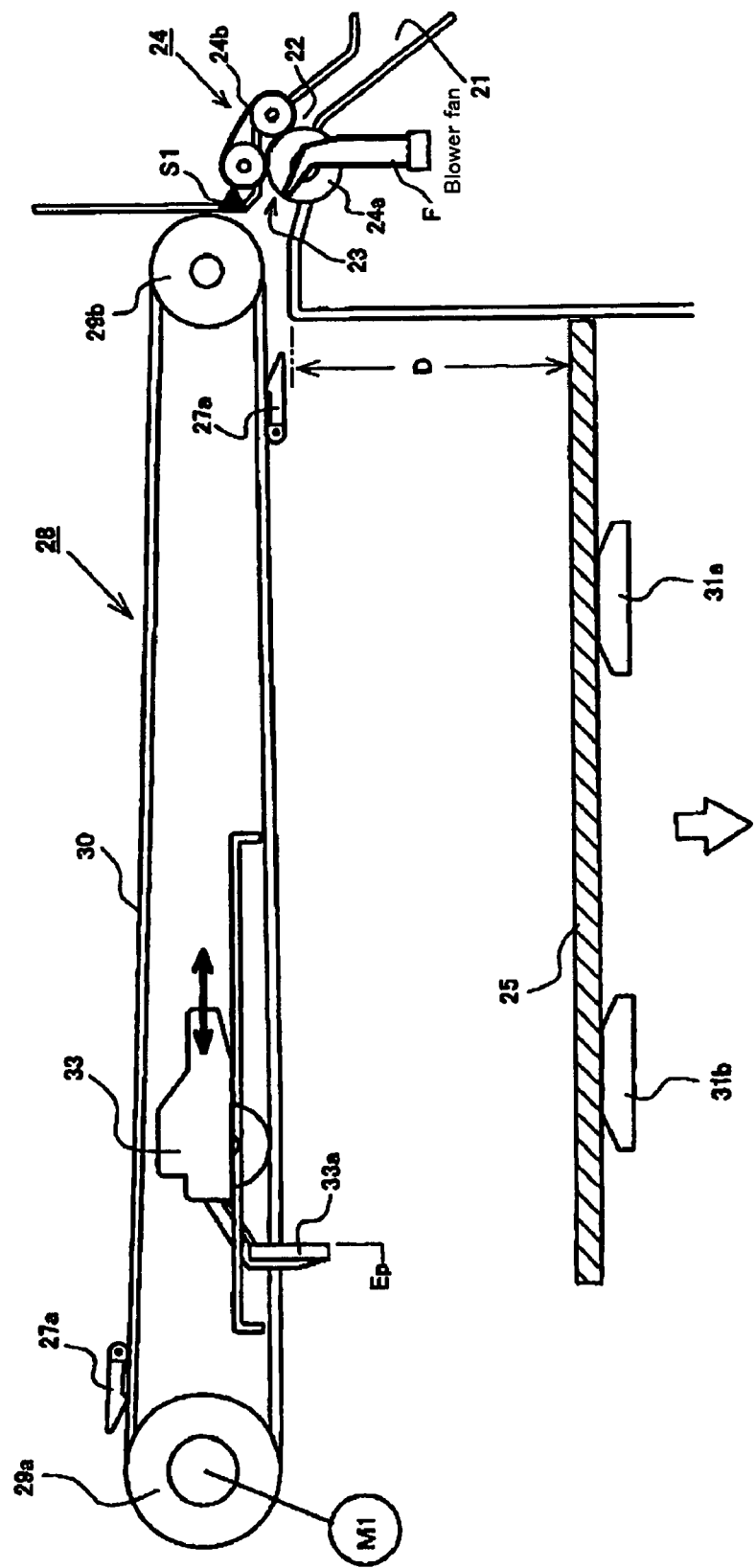
FIG. 2 is a diagram for explaining the main part of the sheet accumulation apparatus in the apparatus of FIG. 1.

FIG. 1 illustrates the entirety of an image formation system including a sheet accumulation apparatus according to the present invention. FIG. 2 illustrates the structure of the main part of the sheet accumulation apparatus.

[Image Formation System]

The image formation system shown in FIG. 1 comprises an image formation apparatus A and a sheet accumulation apparatus B. The sheet accumulation apparatus B is connected to a paper ejection opening 3 of the image formation apparatus A so that a sheet having thereon an image formed by the image formation apparatus A is loaded and stored in a tray of the sheet accumulation apparatus B. The following section will describe the image formation apparatus A and the sheet accumulation apparatus B in this order.

[Image Formation Apparatus]

First, an example of an image formation apparatus for forming an image on a sheet shown in FIG. 1 will be described. The image formation apparatus A shown in FIG. 1 is structured so that a sheet is sent from a paper feeder 1 to an image formation means 2 and the sheet is printed by the image formation means 2 and the printed sheet is subsequently discharged through a paper ejection opening 3. The paper feeder 1 includes paper feed cassettes 1*a* and 1*b* that store therein a plurality of sizes of sheets. The paper feeder 1 feeds specified sheets one by one to the image formation means 2. The image formation means 2 includes, for example, an electrostatic drum 4, a print head (laser emitter) 5 provided at the periphery thereof, a developing section 6, a transfer charger 7, and a fixing section 8. An electrostatic latent image is formed on the electrostatic drum 4 by the laser emitter 5 and is attached with toner by the developing section 6. Then, an image is formed on a sheet by the transfer charger 7 and the image is heated and fixed on the sheet by the fixing section 8. The sheet on which the image is formed in this manner is sequentially discharged through the paper ejection opening 3 (hereinafter referred to as "main body paper ejection opening"). The reference numeral 9 denotes a circulation path for double-side printing through which the sheet having a top surface printed with an image from the fixing section 8 is reversed and the reversed sheet is supplied to the image formation means 2 again so that the back surface of the sheet can be printed. The sheet subjected to a double-side printing in this manner is reversed through a switchback path 10 and is subsequently discharged through the main body paper ejection opening 3.

The reference numeral 11 denotes an image reading apparatus in which a document sheet set on a platen 12 is scanned by a scan unit 13 and is electrically read by a photoelectric conversion element (not shown). This image data is subjected to a digital processing for example by an image processor and is subsequently transferred to a data memorization section 14 to send an image signal to the laser emitter 5. The reference numeral 15 denotes a document feeder apparatus that that feeds document sheets stored in a document stacker 16 to the platen 12.

[Sheet Accumulation Apparatus]

Next, the sheet accumulation apparatus B will be described. The shown sheet accumulation apparatus B comprises a sheet carry-in path 21 having an appropriate shape that is provided in the housing 20 (see FIG. 1), a tray means 25, a sheet conveyance means 28, and a sheet tip regulating means 33. A sheet is sent through the sheet carry-in path 21 to the paper ejection opening 23 and this sheet is conveyed by the sheet conveyance means 28 to a tray tip end. Then, this sheet is abutted to the sheet tip regulating means 33 and is separated from the sheet conveyance means 28 and is dropped on and stored in the tray means 25.

[Sheet Carry-in Path]

The sheet carry-in path 21 is composed of a conveyance guide including a sheet receiving opening 22 and a paper ejection opening 23. This sheet carry-in path 21 includes a paper ejection means 24 for conveying a sheet. The paper ejection means 24 is composed, as shown in FIG. 2, of a driving roller 24a and a following belt 24b (which may be a following roller). The paper ejection means 24 discharges a sheet from the receiving opening 22 to the paper ejection opening 23. This paper ejection means 24 includes a blower means F having an air blowing opening (not shown) to cool a sheet in the path and also uses airflow to guide a sheet from the paper ejection opening 23 to a sheet conveyance means 28 (which will be described later). The reference numeral S1 denotes a paper ejection sensor for detecting a tip end and a rear end of a sheet.

[Sheet Conveyance Means]

The upper part of the downstream of the paper ejection opening 23 has the sheet conveyance means 28. This sheet conveyance means 28 has a grip belt or a vacuum belt for nipping a sheet and nips or vacuums a sheet from the paper ejection opening 23 to convey the sheet to the tray tip end. The reason is that, when a sheet from the paper ejection opening 23 is directly discharged onto a tray, the sheet has a contact with another sheet on the tray to cause defective paper ejection (jamming) and the friction resistance of the sheets causes limitation on a paper ejection speed. Thus, this sheet conveyance means 28 is used to transport a sheet from the paper ejection opening 23 to a tray tip end with the same speed as that at which a sheet is discharged by the paper ejection means 24 and the sheet is dropped and accumulated while the entire sheet moved on the tray. Therefore, the sheet conveyance means 28 is composed of a vacuum belt for vacuuming a sheet or a nip belt for nipping a sheet tip end.

The latter grip belt will be described. The upper part of the tray means 25 (which will be described later) has a pair of pulleys 29a and 29b provided at the apparatus frame 26. These pulleys have therebetween the belt member 30 provided with tension. This belt member 30 includes a gripper member 27. This gripper member 27 grips the tip end of a sheet from the paper ejection opening 23 to guide the sheet to a predetermined discharge position Ep (see FIG. 2) by a nip piece 27a engaged with the sheet tip end. The gripper member 27 is integrated with the belt member 30 so that the gripper member 27 can be moved with the same speed as that of a sheet from the paper ejection opening 23. The pulley 29a of the belt member 30 is connected to the driving motor M1 so that the pulley 29s is rotated in the clockwise direction in FIG. 2. Thus, when the belt member 30 is stopped while the gripper member 27 being opposed to the paper ejection opening 23 and a sheet is discharged through the paper ejection opening 23, the sheet tip end enters between the nip piece 27a and the belt surface to grip the sheet tip end by the elastic force of the nip piece 27a.

[Sheet Tip Regulating Means]

The discharge position Ep of the sheet conveyance means 28 has a sheet tip regulating means 33. This regulating means 33 is provided at the upper side of the tray means 25 so as to be in parallel with the belt member 30. The regulating means 33 includes a stopper piece 33a that is abutted with the tip end of a sheet transported by the belt member 30 to separate the sheet from the conveyance means 28. This stopper piece 33a is provided in the direction of the width of the sheet (a direction orthogonal to the conveyance direction) and is structured, as shown in FIG. 2, to be moved in the forward and rearward directions along the conveyance direction in accordance with the size of the sheet. Specifically, the sheet tip regulating means 33 (hereinafter referred to as "stopper unit") is movably supported by a guide rail (not shown) in the front and rear direction of the conveyance direction of the apparatus frame 26 (the left and right direction in FIG. 2). This stopper unit 33 is connected to a position-adjusting belt (e.g., endless belt) provided in the left and right direction in FIG. 2 with tension. This belt is structured to move the stopper unit 33 in the left and right direction of FIG. 2 by a position-adjusting motor M2 (not shown).

The stopper unit 33 has a detection sensor Sp1 (not shown) that detects a paper level on the tray means 25 (which will be described later). The detection sensor Sp1 detects a predetermined amount of sheets loaded in the tray to lower the tray means 25, the details of which will be described later.

[Structure of Tray Means]

The tray means 25 is composed of a paper-receiving tray (hereinafter referred to as "tray 25") in which sheets are loaded and is shaped so as to receive sheets of the maximum size with a substantially horizontal posture. In particular, the shown tray 25 has a tray member that is separated from the apparatus frame 26 so that the tray 25 can be transported out of the apparatus in a pallet-like manner. The tray 25 is detachably attached to the tray elevating means 31 described below.

[Tray Elevating Means]

Figure 3:
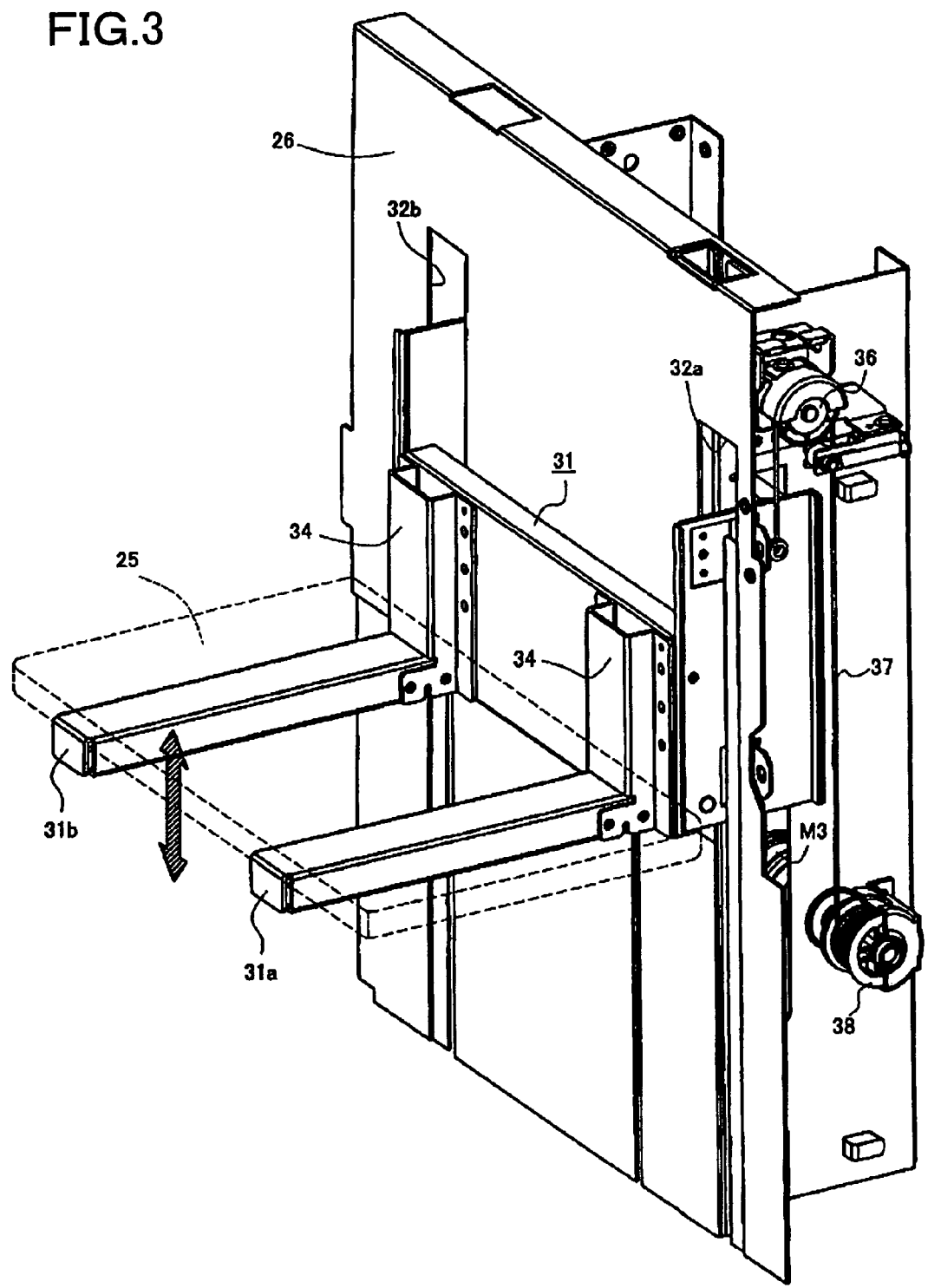
FIG. 3 is a diagram for explaining a tray elevating means in the apparatus of FIG. 2.

The tray elevating (moving, i.e. ascending and descending) means 31 attached with the above-described tray 25 is composed, as shown in FIG. 3, of fork-like elevating arms 31a and 31b (hereinafter referred to as fork member) that are attached to the apparatus frame 26 so that the fork-like elevating arms 31a and 31b can be elevated in the up and down direction. These elevating arms 31a and 31b are structured so that the guide rail 32 is provided at the apparatus frame 26 and the elevating arms 31a and 31b are guided along the guide rail 32 (hereinafter referred to as guide rails 32a and 32b) in the load direction (the up and down direction in FIG. 3) and are supported in an elevating manner. The elevating arms 31a and 31b are suspended by a traction member 37 (e.g., wire, belt) that is wound around a suspension pulley 36 fixed to the apparatus frame 26. The shown traction wire is connected to a winder pulley 38. This winder pulley 38 is connected to an elevating motor M3. Thus, the elevating arm 31 is supported by guide rails 32a and 32b of the apparatus frame 26 and is moved in the up and down direction by the elevating motor M3. The tray 25 is placed on the elevating arms 31a and 31b and is elevated at the lower side of the paper ejection opening 23 in accordance with a load amount. The elevating arms 31a and 31b have a rear end regulating member 34 for regulating the rear end of a sheet. The rear end of a sheet from the paper ejection opening 23 is abutted with the tray 25 placed on the arms and is regulated so that sheets are sequentially accumulated on an already placed sheet.

[Control of Elevation of Tray]

The elevating arms 31a and 31b have an upper limit position sensor Sp2 for detecting an upper limit position, a maximum load position sensor Sp3 for detecting the position of the maximum load, and a lower limit position sensor Sp4 for detecting the position of a lower limit. A control means 60 of the elevating motor M3 (which will be described later) uses detection signals from the paper level detection sensor Sp1 and the respective sensors to drive the rotation of the elevating motor M3 to move the elevating arms 31a and 31b in the up and down direction, the details of the operation will be described in detail later.

[Installation Structure]

Figure 4:
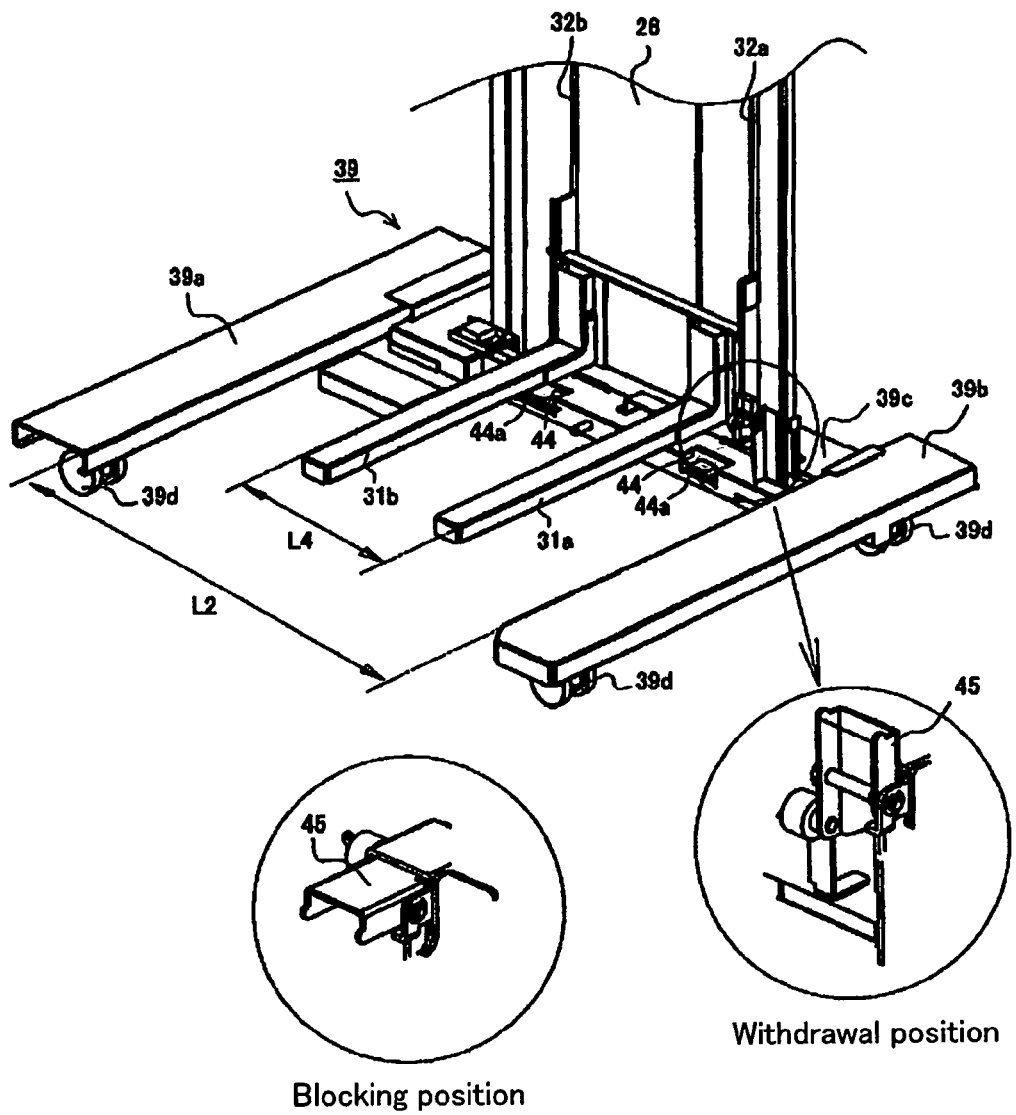
FIG. 4 is a diagram for explaining an installation structure of a tray elevating member.

The following section will describe the installation structure of the above-described elevating arms 31a and 31b with reference to FIG. 4. Guide rails 32a and 32b are fixed to and supported by an installation frame 39 that supports the housing 20 and the apparatus frame 26. This installation frame 39 is an angular U-shaped frame that is provided by opening the front side of the apparatus or the front face of FIG. 1 (the left anterior side of FIG. 4) and by fixedly connecting a pair of left and right side frames 39a and 39b by a connection frame 39c of the back face side. From the front side of the apparatus, a carrier means (transportation hand truck) (which will be described alter) can be carried. The pair of left and right side frames 39a and 39b have a caster 39d to support the total weight of the sheet accumulation apparatus B. This installation frame 39a includes a connecting section of a carrier means (which will be described later) and a stopper means for blocking the connection of the carrier means.

[Carrier Means]

Figure 5:
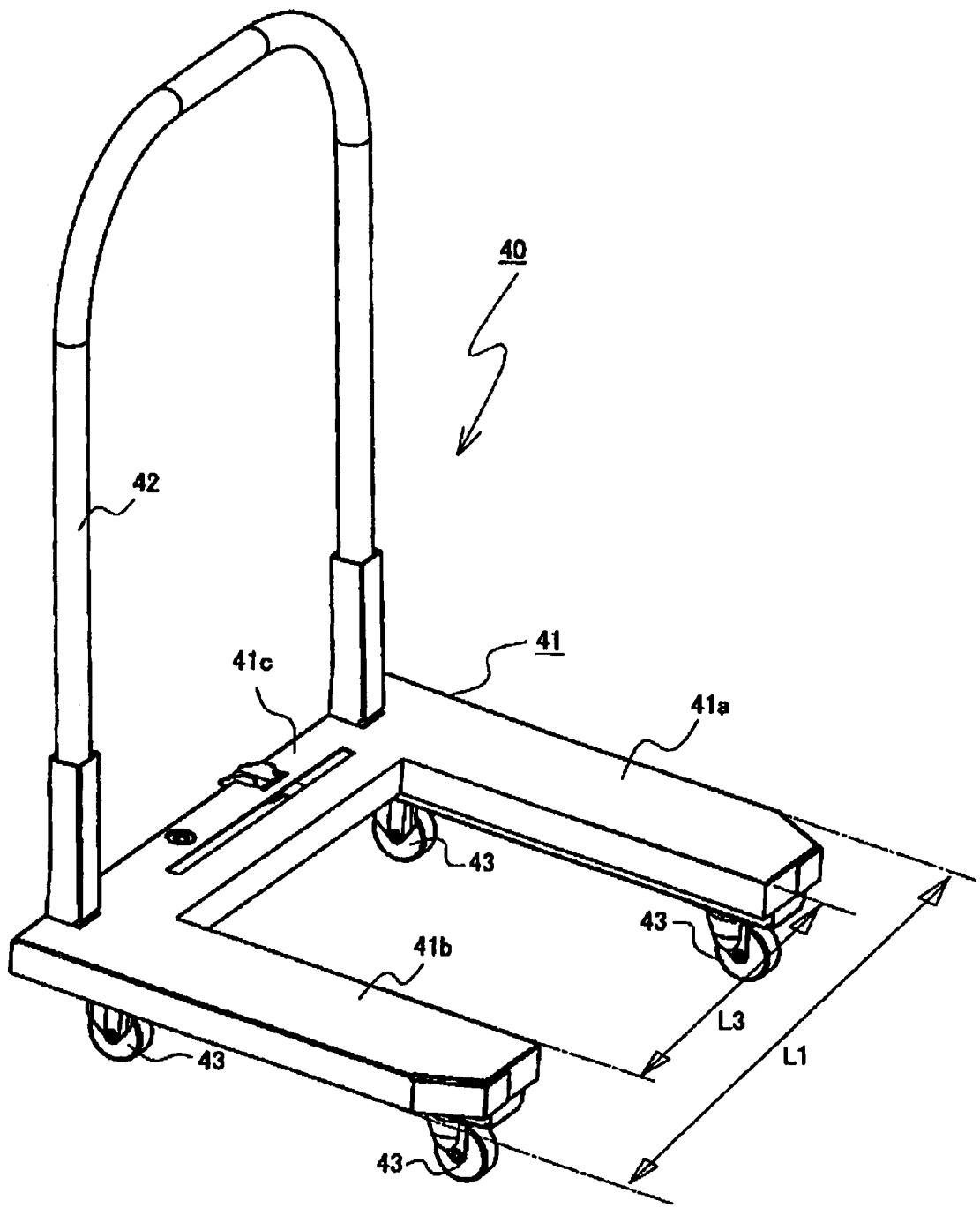
FIG. 5 is a perspective view for explaining the entire structure of a carrier means.

Next, the above-described carrier means will be described with reference to FIG. 5. The above-described tray 25 is detachably provided on the tray elevating member (elevating arm) 31. Then, the tray 25 is provided on the carrier means 40 installed under the tray elevating member 31 to move the tray 25 out of the apparatus. The carrier means 40 has a hand truck frame 41 and an operation handle 42 fixed to the hand truck frame 41. The hand truck frame 41 includes a pair of left and right fork-like arm members 41a and 41b (hereinafter referred to as a fork member) integrated to a connecting arm 41c for connecting the arms and is shaped to have an angular U-like shape. This connecting arm 41c is fixed with the operation handle 42 for a hand truck and the left and right arm members 41a and 41b are attached with a wheel 43. Thus, the handle 42 can be manually operated to provide the tray 25 in which sheets are loaded on the arm members 41a and 41b to transport the tray 25.

[Positioning and Setting of Carrier Means]

The arm members 41a and 41b of the carrier means 40 are guided between a pair of left and right side frames 39a and 39b of the installation frame 39 to be guided into the housing 20. Specifically, the arm members 41a and 41b have an outer dimension L1 that is substantially equal to an inner dimension L2 of the side frames 39a and 39b of the apparatus frame (L1=L2) and are guided between the side frames to enter the apparatus housing 20. Thus, the side frames 39a and 39b of the installation frame 39 constitute a guide member for guiding the carrier means 40 into the apparatus housing 20. The left and right arms 41a and 41b are structured so that, in order to position the elevating arms 31a and 31b at the inner side thereof, the left arm 41a has a wide width (L3) while the right arm 41b have a narrow width (L4) to establish L3>L4. In the present invention, the elevating arms 31a and 31b and the left and right arm members 41a and 41b of the carrier means 40 are respectively formed by a fork-like arm and these arms are engaged in the substantially same plane. In the structure as described above, the carrier means 40 is positioned and set in the housing 20. When the elevating arms 31a and 31b are descended in this status, the tray 25 provided on the elevating arm is provided on the arm members 41a and 41b of the carrier means 40 and is subsequently attached in a pallet-like manner.

Thus, the connection frame 39c of the installation frame 39 has a positioning concave section (positioning member) 44 that is engaged with a protruded section (not shown) formed in the arm member 41 of the carrier means 40. This positioning concave section 44 includes therein a magnet catch 44a, and this catch includes therein a detection sensor S3 having a magnetic sensor (read sensor). Thus, the carrier means 40 is guided to the side frames 39a and 39b of the installation frame 39 and is positioned by being engaged with the positioning concave section 44 and is retained by the magnet catch 44a. Then, the detection sensor S3 detects whether the carrier means 40 is attached at a predetermined position or not to descend the elevating arms 31a and 31b positioned at the upper side.

[Prohibition of Double Attachment of Tray]

The present invention provides the structure as described below in order to prevent a situation where the above-described tray elevating means (elevating arm) 31 and the carrier means 40 are both attached with the tray means (tray) 25, and collide to each other in the housing 20 and cause the collapse of a pile of sheets or the failure of the apparatus. The first method provides a stopper means having a locking lever 45 in the apparatus frame 26. The second method provides a stopper means having a locking lever that can be provided at any of "the carrier means 40 and the tray means 25 attached to the carrier means 40" and "the apparatus frame 26", and the other has a concave part engaged with this and a shutter member for closing this concave part.

[Operation of Elevating Tray]

Next, the following section will describe an operation for subsequently attaching the above-described tray means 25 between the carrier means 40 and the tray elevating means 31. The apparatus housing 20 has open/close doors 50a and 50b at the front side of the apparatus (front side of FIG. 1), and the open/close doors 50a and 50b have a door open/close sensor Sp5. Then, the control means 60 that controls the winding motor M3 uses an initialization operation when the power source of the apparatus is turned ON to elevate the tray 25 attached to the elevating arms 31a and 31b to the position detected by the paper level detection sensor Sp1. Then, the detection signal of the paper level detection sensor Sp1 lowers the predetermined amount the elevating arms 31a and 31b. Then, a previously-set step D (see FIG. 6(a)) is formed between the paper ejection opening 23 and the tray 25, and a sheet from the paper ejection opening 23 is loaded and stored on the tray 25.

Figure 6A:
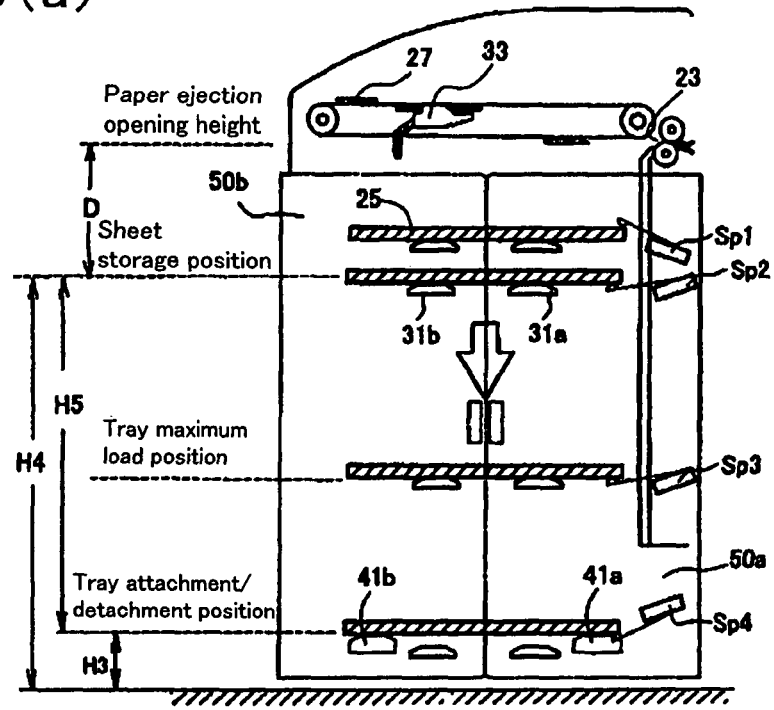
FIGS. 6(*a*) and 6(*b*) are diagrams for explaining an operation for elevating the tray means and shows sheets loaded in the tray means.
Figure 6B:
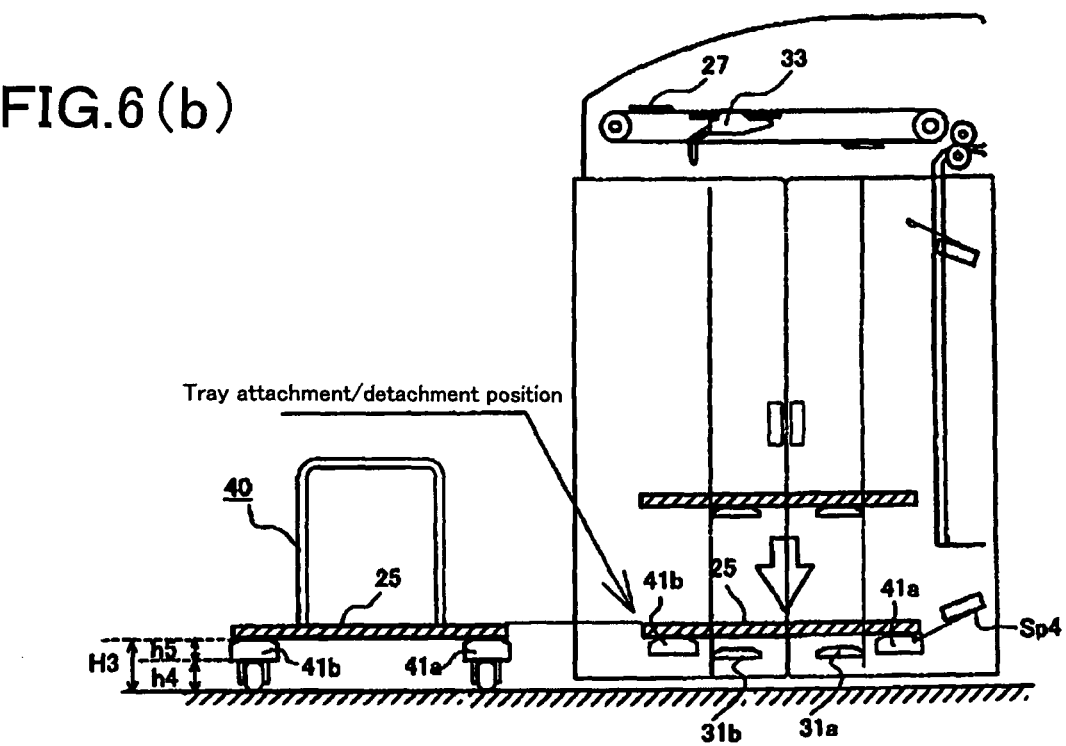
Figure 7A:
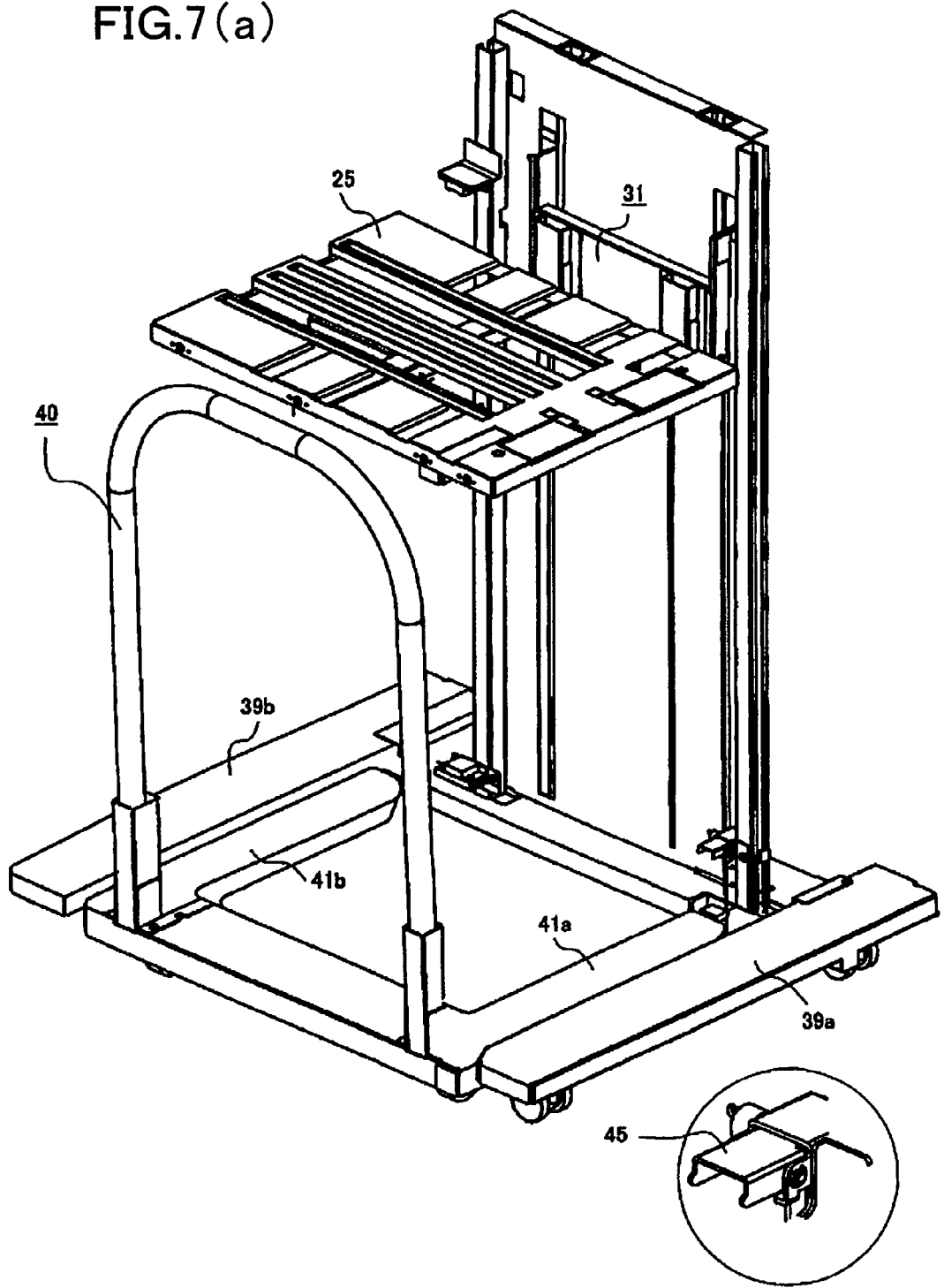
FIG. 7(*a*) illustrates a relation between the tray elevating means and a carrier means and shows the tray means at a load position, FIG. 7(*b*) illustrates the relation between the tray elevating means and the carrier means and shows the tray means at an attachment/detachment position.
Figure 7B:
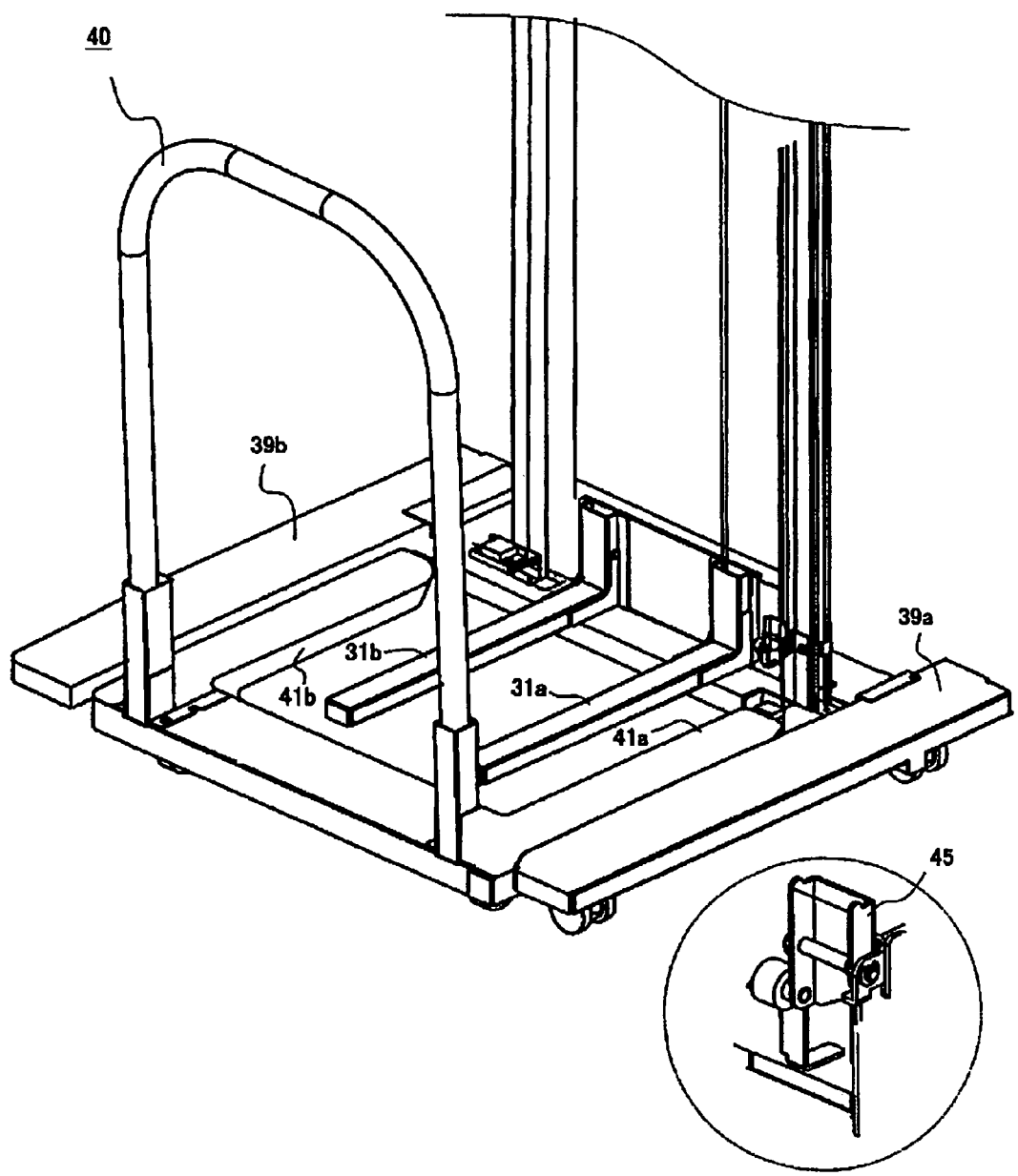

When a predetermined amount of sheets is loaded on the tray, this is detected by the paper level detection sensor Sp1 and the control means 60 drives the rotation of the elevating motor M3 so as to lower the elevating arms 31a and 31b by a predetermined amount (see FIG. 6(b)). When sheets are loaded on the tray and the load amount reaches a predetermined amount as described above, a signal from the paper level detection sensor Sp1 causes the control means 60 to lower the elevating arms 31a and 31b by a predetermined amount to gradually descend the elevating arms 31a and 31b in accordance with the load amount of sheets. When the elevating arms 31a and 31b reach the maximum load position, the maximum load position sensor Sp3 detects this to generate a "full detection signal" to stop the apparatus.

Next, when a user uses the full detection signal or a job completion signal to open the open/close doors 50a and 50b, the control means 60 detects this by the door open/close sensor Sp5 to safely stop the apparatus. In this status, the elevating arms 31a and 31b are retained at a full position or at the upper position thereof. When the user causes the carrier means 40 to enter the apparatus, the hand truck frame 41 of the carrier means 40 causes the arm members 41a and 41b to be guided to the side frames 39a and 39b of the installation frame 39 to guide the arm members 41a and 41b into the apparatus. When a protrusion section (not shown) of the carrier means 40 is engaged with the positioning concave section 44, the detection sensor S3 detects this engagement. The control means 60 uses a signal from the detection sensor S3 to descend the elevating arms 31a and 31b to the attachment/detachment position. When the lower limit position sensor Sp4 is turned "ON", the elevating motor M3 is stopped. Then, the elevating arms 31a and 31b move tray 25 to the arm members 41a and 41b of the hand truck frame 41 in the status of FIG. 6(b).

Figure 8A:
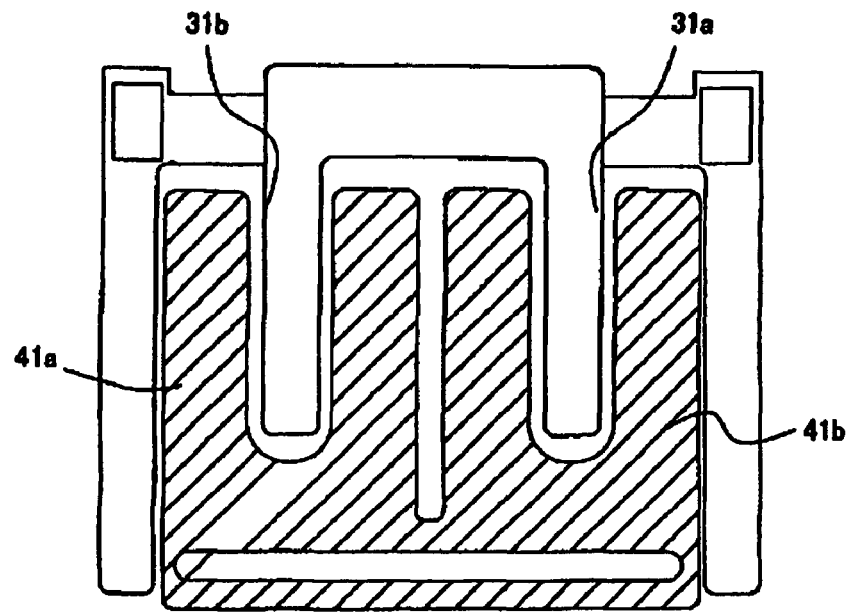
FIGS. 8(*a*) and 8(*b*) show different forms of a fork member according to the present invention.
Figure 8B:
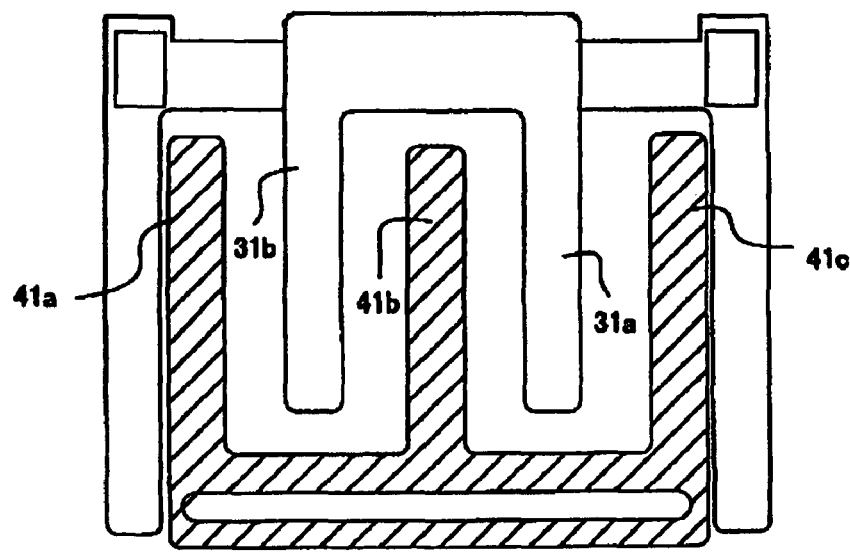
Figure 9A:
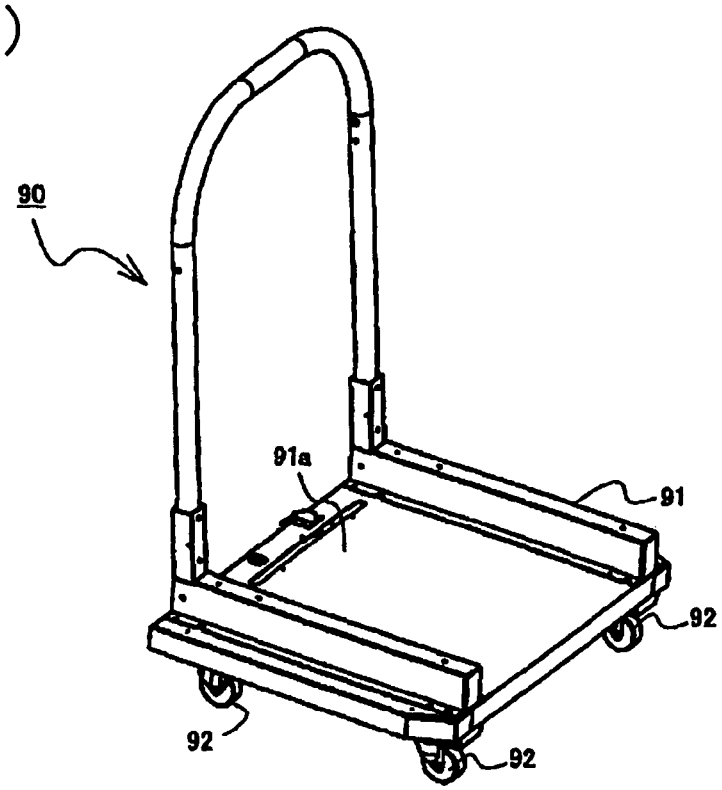
FIGS. 9(*a*) and 9(*b*) illustrate a structure where the tray means is provided in a conventionally generally known hand truck frame.
Figure 9B:
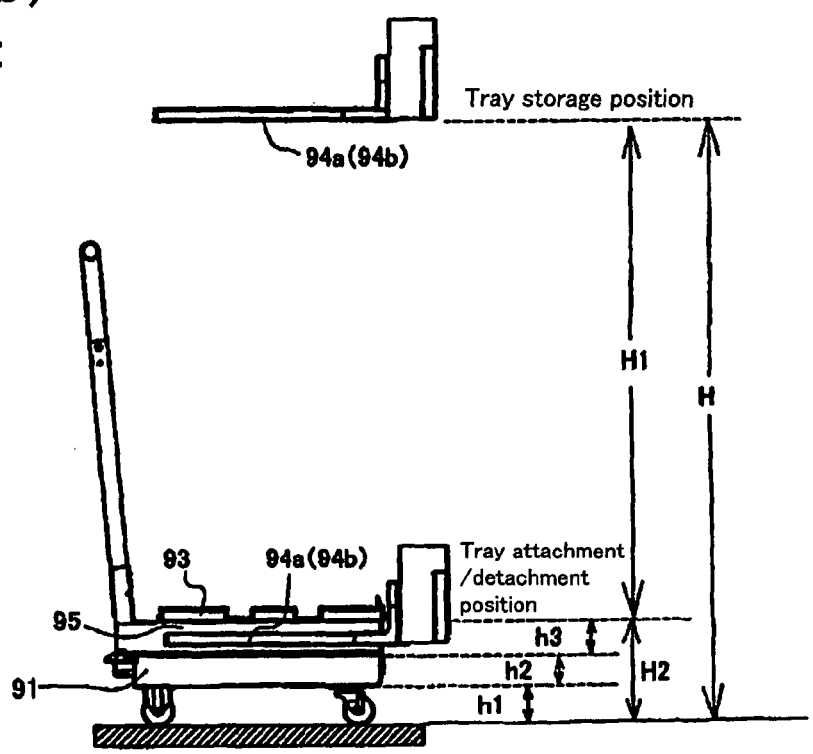

The carrier means 40 having the structure as described above has a height H3 for attaching or detaching the tray 25 for which H3=h4 (wheel height)+h5 (arm member height (thickness)) is established. Thus, the height H3 is lower than that in the conventional apparatus structure shown in FIG. 9(b). Thus, as shown in FIG. 6(a), a distance (H4) between the sheet storage position of the tray 25 and the contact face establishes a relation of H4=H5 (tray elevating height)+H3 (tray attachment/detachment height), thus providing the apparatus with a compact size. In the present invention, a fork member is not limited to two arm members and also may be composed of a plurality of arm members as shown in FIGS. 8(a) and 8(b). In other words, the fork member may have any shape so long as the elevating arms 31a and 31b and the arm members 41a and 41b of the hand truck frame 41 are fitted (or engaged) to each other on a substantially the same plane.

The disclosure of Japanese Patent Application No. 2006-279890, filed on Oct. 13, 2006, is incorporated in the application.

While the invention has been explained with reference to the specific embodiments of the invention, the explanation is illustrative and the invention is limited only by the appended claims.

What is claimed is:

1. A sheet accumulation apparatus, comprising:
   a tray moving device having a first fork member and elevatably provided at a lower side of a paper ejection opening for sequentially discharging sheets;
   a tray device detachably disposed on the first fork member for mounting the sheets ejected from the paper ejection opening;
   a driving device for moving the tray moving device up and down under the paper ejection opening;
   an installation frame equipped with the tray moving device and the driving device, and having side frames; and
   a carrier device which receives the tray device from and provides the tray device to the first fork member at an attachment/detaching position at which the tray moving device is lowered in the sheet accumulation apparatus to carry the tray device outside the apparatus,
   wherein the carrier device includes a hand truck frame with a second fork member for mounting the tray device, a transport wheel formed immediately beneath the second fork member, and an operation handle connected to the hand truck frame for operating the hand truck frame, and
   the side frames form a guide for guiding the second fork member to align with the first fork member and are arranged such that when the tray device is transferred between the tray moving device and the carrier device at the attachment/detachment position, upper surfaces of the first and second fork members are aligned side by side and are located at a substantially same plane.

2. The sheet accumulation apparatus according to claim 1, wherein said installation frame includes a positioning member for abutting the carrier device at the attachment/detachment position to position the carrier device.

3. The sheet accumulation apparatus according to claim 1, wherein each of the first and second fork members comprises a pair of left and right arms having a predetermined interval therebetween so that the tray device can be placed on the first and second fork members, and the left and right arms of the first fork member are disposed between the left and right arms of the second fork member.

4. The sheet accumulation apparatus according to claim 3, wherein the hand truck frame has a connecting arm for connecting the left and right arms of the second fork member to form a substantially U-shape, and the operation handle is fixed to the connecting arm.

5. The sheet accumulation apparatus according to claim 1, wherein the first fork member is elevated by the driving device between an upper limit position for positioning the tray device at the paper ejection opening and a lower limit position under the tray device placed on the second fork member of the carrier device positioned and set at the attachment/detachment position.

6. The sheet accumulation apparatus according to claim 1, further comprising a sheet conveyance device for conveying a sheet from the paper ejection opening to a downstream of the paper ejection opening at an upper side of the tray device, and a sheet tip regulating device to abut against an end of the sheet sent from the sheet conveyance device to regulate the sheet and store the sheet on the tray device,
   wherein the carrier device includes a positioning member for abutting the carrier device at the attachment/detachment position to position the carrier device.

7. An image forming apparatus, comprising:
   an image forming device for forming an image on a sheet, and
   the sheet accumulation apparatus according to claim 6, wherein the sheets from the image formation device are sequentially discharged through the paper ejection opening, and the sheets are loaded on the tray device.

8. An image forming apparatus, comprising:

an image forming device for forming an image on a sheet, and the sheet accumulation apparatus according to claim 1, wherein the sheets from the image formation device are sequentially discharged through the paper ejection opening, and the sheets are loaded on the tray device.

9. The sheet accumulation apparatus according to claim 1, wherein the installation frame includes a positioning member for abutting the carrier device at the attachment/detachment position to position the carrier device.

10. The sheet accumulation apparatus according to claim 9, wherein the positioning member includes concave sections for receiving front ends of the second fork member.

11. The sheet accumulation apparatus according to claim 10, further comprising a detection sensor for detection whether the carrier member is attached to the installation frame.

* * * * *